US011485504B2

(12) United States Patent
Thomassin et al.

(10) Patent No.: US 11,485,504 B2
(45) Date of Patent: Nov. 1, 2022

(54) AIRCRAFT POWER PLANT WITH SUPERCRITICAL $CO_2$ HEAT ENGINE

(71) Applicant: PRATT & WHITNEY CANADA CORP., Longueuil (CA)

(72) Inventors: Jean Thomassin, Sainte-Julie (CA); Serge Dussault, Ste-Julie (CA); Joseph Brent Staubach, Colchester, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 15 days.

(21) Appl. No.: 17/081,051

(22) Filed: Oct. 27, 2020

(65) Prior Publication Data
US 2022/0127009 A1    Apr. 28, 2022

(51) Int. Cl.
*B64D 27/04* (2006.01)
*B64D 27/24* (2006.01)
*F01K 25/10* (2006.01)
*F02B 37/00* (2006.01)
*F02C 5/00* (2006.01)
*F02C 5/06* (2006.01)
(Continued)

(52) U.S. Cl.
CPC .............. *B64D 27/04* (2013.01); *B64D 27/24* (2013.01); *F01K 25/103* (2013.01); *F02B 37/00* (2013.01); *F02C 5/00* (2013.01); *F02C 5/06* (2013.01); *F02C 7/00* (2013.01); *F02G 5/02* (2013.01); *B64D 2027/026* (2013.01); *F02B 2053/005* (2013.01)

(58) Field of Classification Search
CPC .. B64D 27/04; B64D 27/24; B64D 2027/026; F01K 25/103; F02C 5/00; F02C 5/06; F02C 7/00; F02G 5/02; F02B 2053/005; F02B 37/00
USPC .......................... 60/39.182, 605.1, 614, 616
See application file for complete search history.

(56) References Cited

U.S. PATENT DOCUMENTS 9,540,999 B2   1/2017  Stapp
10,107,195 B2  10/2018  Bolduc et al.
(Continued)

FOREIGN PATENT DOCUMENTS

CN   110107366 A   8/2019
EP     3048281 B1   4/2017
EP     3153690 A1   4/2017

OTHER PUBLICATIONS

English translation of China patent document No. CN110107366 dated Aug. 9, 2019, https://patents.google.com/patent/CN110107366A/en?oq=CN110107366A, accessed on Oct. 7, 2020.
(Continued)

*Primary Examiner* — Hoang M Nguyen
(74) *Attorney, Agent, or Firm* — Norton Rose Fulbright Canada LLP (57) ABSTRACT

Aircraft power plants including combustion engines, and associated methods for recuperating waste heat from such aircraft power plants are described. A method includes transferring the heat rejected by the internal combustion engine to supercritical $CO_2$ ($sCO_2$) used as a working fluid in a heat engine. The heat engine converts at least some the heat transferred to the $sCO_2$ to mechanical energy to perform useful work onboard the aircraft.

18 Claims, 6 Drawing Sheets

(51) Int. Cl.
  *F02C 7/00*   (2006.01)
  *F02G 5/02*   (2006.01)
  *B64D 27/02*   (2006.01)
  *F02B 53/00*   (2006.01)

(56) References Cited

U.S. PATENT DOCUMENTS

| | | | |
|---|---|---|---|
| 10,458,364 B2 | 10/2019 | Armstrong et al. | |
| 10,557,407 B2 | 2/2020 | Dussault et al. | |
| 11,149,592 B2* | 10/2021 | Ryu | F02C 1/10 |
| 11,187,148 B1* | 11/2021 | MacDonald | F02C 7/10 |
| 2015/0033737 A1* | 2/2015 | Mitri | F01K 7/32 |
| | | | 60/614 |
| 2017/0226959 A1* | 8/2017 | Julien | F02K 1/82 |
| 2017/0254229 A1 | 9/2017 | Fletcher | |
| 2017/0356340 A1 | 12/2017 | Vaisman et al. | |
| 2018/0274481 A1 | 9/2018 | Silva | |
| 2019/0249599 A1 | 8/2019 | Sen et al. | |
| 2019/0309997 A1* | 10/2019 | Fletcher | F25B 9/004 |
| 2021/0207534 A1* | 7/2021 | Staubach | F28D 1/0473 |

OTHER PUBLICATIONS

Antoinio Agresta et al., Feasibility Study of a Supercritical Cycle as a Waste Heat Recovery System, Proceedings of the International Mechanical Engineering Conference & Exposition, Nov. 15-21, 2013, ASME, USA.

Florian Jacob et al., Performance of a Supercritical CO2 Bottoming Cycle for Aero Applications, Appl. Sci. Mar. 6, 2017, 7, 255; doi:10.3390/app7030255, Switzerland.

C.M. De Servi et al., Exploratory Assessment of a Combined-Cycle Engine Concept for Aircraft Propulsion, Proceedings of the 1st Global Power and Propulsion Forum, Jan. 16-18, 2017, Switzerland.

Yoonhan Ahn et al., Review of Supercritical CO2 Power Cycle Technology and Current Status of Research and Development, Aug. 13, 2015, Elsevier Korea LLC, Korea.

Wan Yu et al., Thermodynamic Analysis of Supercritical Carbon Dioxide Cycle for Internal Combustion Engine Waste Heat Recovery, Processes, Feb. 12, 2020, 8, 216; doi:10.3390/pr8020216, MDPI, China.

European Patent Office, Communication re extended European search report for European patent application No. 21205046.2, dated Mar. 30, 2022.

* cited by examiner

AIRCRAFT POWER PLANT WITH SUPERCRITICAL CO₂ HEAT ENGINE

TECHNICAL FIELD

The disclosure relates generally to aircraft engines, and more particularly to recuperating waste heat from aircraft engines.

BACKGROUND

It is desirable for aircraft engines and systems to operate in an energy efficient manner to promote reduced fuel consumption and operating costs. During operation of internal combustion engines, waste heat can be generated. In a turbofan aircraft engine for example, waste heat is carried in the flow of hot exhaust gas that exits the turbofan engine. Since the flow of exhaust gas exiting the turbofan engine contributes to the thrust produced by the engine, attempting to recuperate heat from the exhaust gas in a way that improves overall energy efficiency can be challenging. Improvement is desirable.

SUMMARY

In one aspect, the disclosure describes an aircraft propulsion system comprising: an internal combustion engine using intermittent combustion during operation; a propeller for propelling the aircraft, the propeller being drivingly engaged with the internal combustion engine; a turbocharger associated with the internal combustion engine, the turbocharger including a turbocharger turbine configured to be driven by a flow of exhaust gas from the internal combustion engine, and a turbocharger compressor drivingly engaged with the turbocharger turbine and configured to compress combustion air for the internal combustion engine; a heat engine using supercritical carbon dioxide ($sCO_2$) as a working fluid to convert heat into mechanical energy; and a first heat exchanger to facilitate heat transfer between the exhaust gas downstream of the turbocharger turbine and the $sCO_2$.

In another aspect, the disclosure describes an aircraft power plant comprising: a Wankel engine; and a heat engine using supercritical carbon dioxide ($sCO_2$) as a working fluid to convert heat into mechanical energy, the heat engine being in thermal communication with exhaust gas from the Wankel engine.

In a further aspect, the disclosure describes a method of operating an aircraft power plant including an internal combustion engine. The method comprises: operating the internal combustion engine of the aircraft power plant using intermittent combustion; generating heat using the internal combustion engine; transferring the heat from the internal combustion engine to supercritical carbon dioxide ($sCO_2$) used as a working fluid in a heat engine; and converting at least some of the heat transferred to the $sCO_2$ to mechanical energy using the heat engine.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes aircraft power plants and associated methods for converting waste heat generated by aircraft engines into useful work. In various embodiments, power plants described herein make use of aircraft engine types that do not generate significant thrust for propelling the aircraft from their flow of exhaust gas exiting the engine. Accordingly, the flow of exhaust gas can be manipulated by passing it through a heat exchanger and cooling it without significantly reducing a thrust output or overall efficiency of the engine. The heat from the exhaust gas of the aircraft engine (and/or other heat sources of the aircraft engine) may be transferred to a heat engine that converts at least some of the heat into mechanical energy that may in turn perform useful work onboard the aircraft.

In some embodiments, the use of supercritical carbon dioxide ($sCO_2$) as a working fluid for the heat engine may be beneficial for some aircraft applications. For example, the applicable temperatures and also the difference in temperature between the heat sources of the aircraft engine and the ambient air outside of the aircraft either at (e.g., cruising) altitude or on the ground on relatively cold days may promote a relatively desirable thermodynamic efficiency for a heat engine using $sCO_2$ as a working fluid. The use of $sCO_2$ as a working fluid may also provide a relatively environmentally-friendly solution for converting otherwise wasted heat from an aircraft engine into useful work. Since $sCO_2$ has a relatively high density, its use as the working fluid in the heat engine promotes compactness of the heat engine, which may be fitting for aircraft applications.

The term "connected" or "coupled to" may include both direct connection or coupling (where two elements in question contact each other) and indirect connection or coupling (where at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
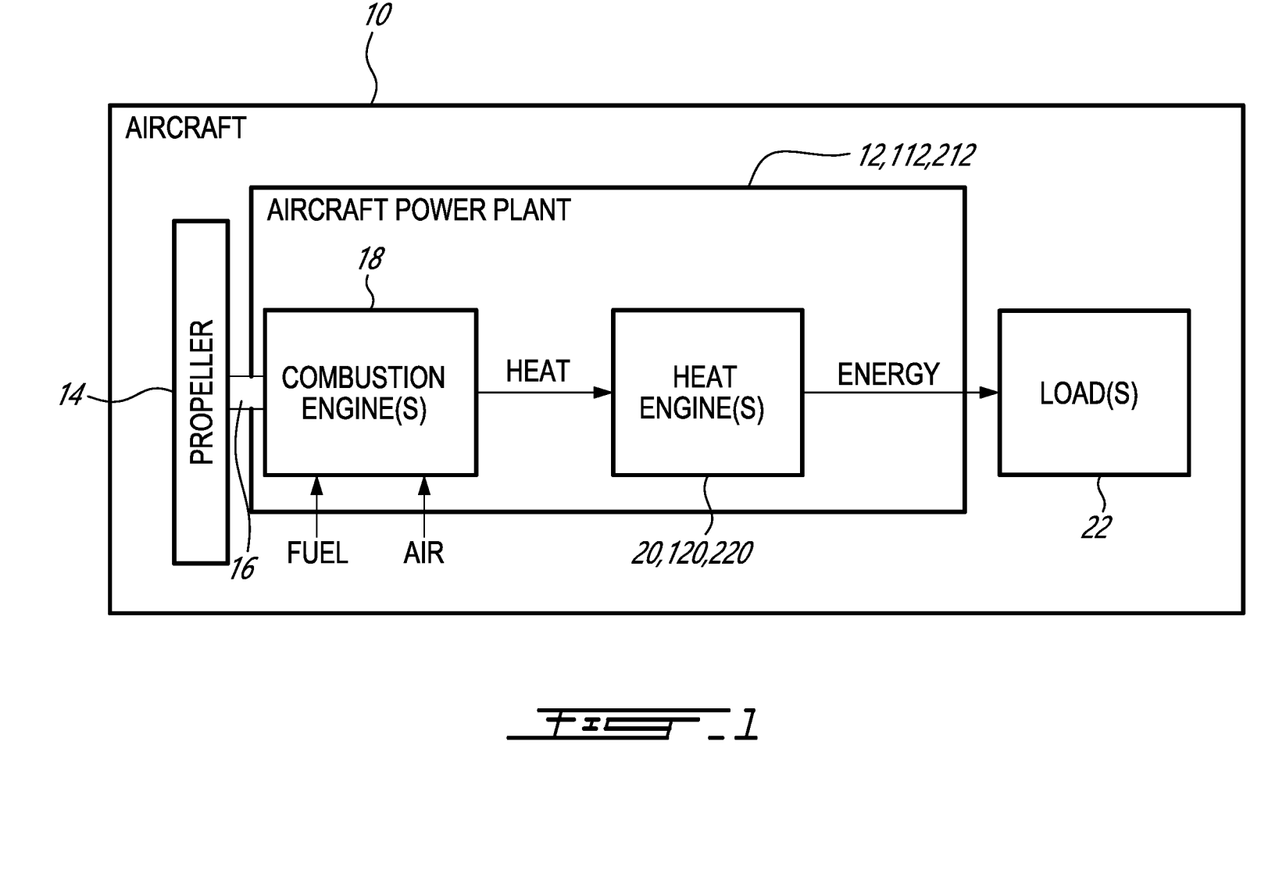
FIG. 1 schematically shows an aircraft including an exemplary aircraft power plant as described herein.

FIG. 1 schematically shows aircraft 10 including an exemplary power plant 12 as described further below. In various embodiments, aircraft 10 may be a manned or unmanned aircraft (e.g., drones) such as corporate, private, fixed-wing, rotary-wing (e.g., helicopter), commercial and passenger aircraft. In some embodiments, power plant 12 may be part of a propulsion system of aircraft 10. For example, power plant 12 may be drivingly engaged with propeller 14 via output shaft 16, which may be a propeller drive shaft so that power plant 12 may provide energy for propulsion of aircraft 10 and optionally also provide energy for functions other than propulsion by supplying compressed air to pneumatic loads and/or driving accessories such as an electric generator and a hydraulic pump via an accessory gearbox.

Alternatively, power plant 12 may be an auxiliary power unit (APU) of aircraft 10 and may provide energy exclusively for functions other than propulsion of aircraft 10. Such functions other than propulsion may include supplying compressed air to pneumatic loads, providing electric energy and/or driving a hydraulic pump for example. In some embodiments, power plant 12 may be a supplemental power unit (SPU) of aircraft 10 that may indirectly assist one or more main engines of aircraft 10 by providing compressed air and/or powering other accessory loads during certain phases of flight to allow more of the main engine(s)' power output to be dedicated to the propulsive function.

Power plant 12 may include one or more (e.g., internal) combustion engines 18 (referred hereinafter in the singular as "engine 18"). Engine 18 may be of a type other than a turbofan engine. For example, engine 18 may be of a type where the exhaust gas of engine 18 produces no significant thrust for propelling aircraft 10 so that heat may be recuperated (e.g., by having the exhaust stream pass through a heat exchanger) from the exhaust gas without significantly affecting the propulsive energy output of engine 18. In some embodiments, engine 18 may include a gas turbine engine in a turboprop or turboshaft installation. In some embodiments, engine 18 may include an internal combustion engine using intermittent combustion during operation. Such engine 18 with intermittent combustion may be a reciprocating engine such as piston engine, or a pistonless rotary engine for example. In some embodiments, engine 18 may include a Wankel engine using an eccentric rotary design to convert pressure into rotating motion. In some embodiments, engine 18 may be a compound cycle engine as described in U.S. Pat. No. 10,107,195 (Title: COMPOUND CYCLE ENGINE), the entire contents of which are incorporated by reference herein. In some embodiments, engine 18 may operate on a mixture of relatively heavy fuel (e.g. diesel, kerosene (jet fuel), equivalent biofuel) and air.

Power plant 12 may also include one or more heat engines 20 (referred hereinafter in the singular) operatively coupled to engine 18 and driven using heat generated and rejected by engine 18, and transferred to a working fluid of heat engine 20. The working fluid of heat engine 20 may be in thermal communication with engine 18. As explained below, heat from one or more heat sources (e.g., exhaust gas, coolant fluid, lubricating fluid) from engine 18 may be transferred to the working fluid of heat engine 20. The working fluid of heat engine 20 may be $sCO_2$. As explained below, heat engine 20 may implement a closed thermodynamic cycle using $sCO_2$ as a working fluid where the working fluid is maintained at or above its critical temperature and critical pressure for at least part of the thermodynamic cycle. In some embodiments, the working fluid may be kept at or above its critical temperature and critical pressure throughout substantially the entire thermodynamic cycle implemented by heat engine 20. When $CO_2$ is at or above its critical point, it can adopt properties between a gas and a liquid, which may be desirable for use as a working fluid in heat engine 20. However, in other embodiments, other working fluids (supercritical or not) may be utilized (e.g., any suitable organic fluid, refrigerant fluid, etc.).

Heat engine 20 may convert at least some of the heat transferred from engine 18 to heat engine 20 into mechanical energy that may be used to perform useful work onboard aircraft 10 by powering one or more loads 22 (referred hereinafter in the singular). Load 22 may include one or more electric generators, one or more air compressors, and/or one or more hydraulic pumps. Aircraft power plant 12 may be a combined cycle power plant where engine 18 is operated as a topping cycle and heat engine 20 is operated as a bottoming cycle. In some embodiments, energy produced by heat engine 20 may also be combined with engine 18 to drive propeller 14 via appropriate mechanical coupling (i.e., clutch, gearbox).

Figure 2:
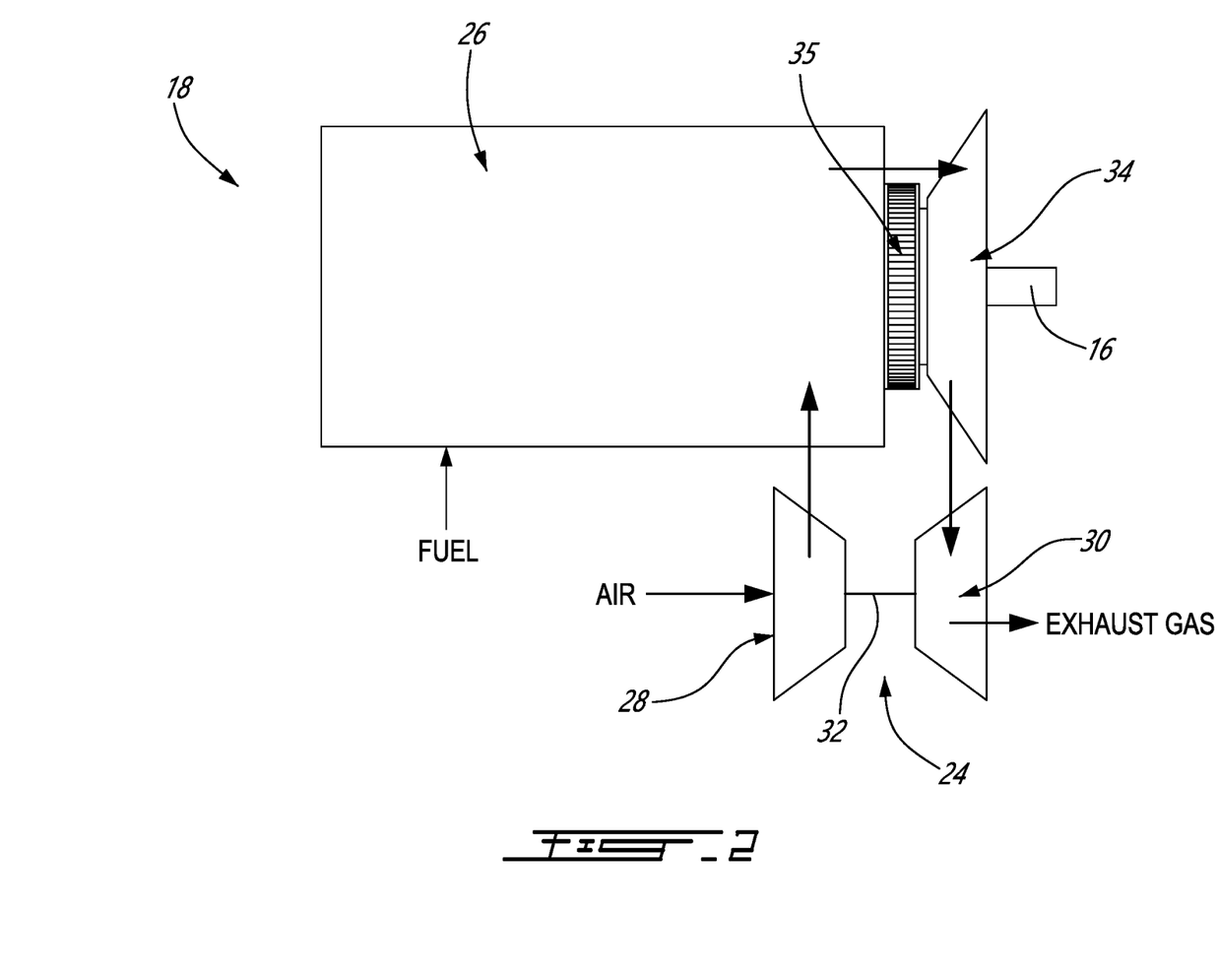
FIG. 2 schematically shows an exemplary internal combustion engine of the propulsion system of FIG. 1.

FIG. 2 schematically shows an exemplary combustion engine 18. In some embodiments, engine 18 may be turbocharged by way of optional turbocharger 24. In some embodiments, engine 18 may be a turbo-compound internal combustion engine such as described in U.S. Pat. No. 10,107,195 as an example. Engine 18 may include one or more (e.g., Wankel) rotary internal combustion engines. Engine 18 may include a rotor disposed inside and sealingly engaged with housing 26. Engine 18 may drive one or more loads which may or may not include propeller 14 via output shaft 16 which may be drivingly engaged with the load(s) via a (e.g., speed-reducing) gearbox.

Compared to a continuous combustion engine such as a gas turbine engine, a liquid-cooled intermittent combustion engine may provide two significant sources of heat at two different temperatures for driving heat engine 20. The two sources of heat at different temperatures may be suitable for staged heat recuperation as described below in reference to FIGS. 3 and 4. Staged heat recuperation may be desirable in some situations because of lower thermal stresses that may be exhibited in two or more staged heat exchangers compared to having a single heat exchanger facilitating heat transfer between two fluids at a greater temperature difference.

In a non-limiting example using typical numerical values and the available fuel energy as a reference, if a typical gas turbine engine converts about 25% of fuel energy into shaft power, about 73% of the fuel energy may be released in the exhaust gas stream at a relatively high temperature and only about 2% or less of the fuel energy may be released via the lubricating fluid at a relatively low temperature. On the other hand, for an intermittent combustion engine of similar output power rating, about 35% of the fuel energy may be converted into shaft power, about 40% of the fuel energy may be released in the exhaust gas stream, about 15% of the fuel energy may be released via a coolant fluid, and about 10% of the fuel energy may be released via a lubricating fluid. The 40% of the fuel energy released in the exhaust stream may provide a meaningful high temperature source for driving heat engine 20. In addition, the 25% of the fuel energy released via the coolant fluid (15%) and the lubricating fluid (10%) may provide a meaningful low temperature source for driving heat engine 20. The high and low temperature sources may be more suitable for staged heat recuperation compared to the 73% of the fuel energy in the exhaust gas stream and the 2% or less of the fuel energy in the lubricating fluid of the gas turbine engine. Also, compared to transferring heat from a gas, heat transfer from liquid coolant fluid and/or liquid lubricating fluid may, in some situations, be conducted via a relatively more compact and lightweight heat exchanger due to a higher heat transfer coefficient from the liquid heat source(s).

Turbocharger 24 may include turbocharger compressor 28 and turbocharger turbine 30 which may be drivingly interconnected and engaged via shaft 32 so that turbocharger compressor 28 may be driven by turbocharger turbine 30. Turbocharger compressor 28 and turbocharger turbine 30 may each be a single-stage device or a multiple-stage device with a single shaft, or split on multiple independent shafts in parallel or in series, and may be a centrifugal, axial or mixed device. Shaft 32 of turbocharger 24 may be mechanically disconnected from output shaft 16 and may rotate separately from output shaft 16. Turbocharger compressor 28 of turbocharger 24 may receive (e.g., ambient) air and compress the air to be supplied as combustion air to engine 18.

Engine 18 may use intermittent combustion during operation and may provide a pulsating exhaust gas flow. The exhaust gas flow output from engine 18 may be directed to optional first stage turbine 34 drivingly engaged with output shaft 16 to extract energy from the flow of exhaust gas and transfer that extracted energy to output shaft 16. First stage turbine 34 may be configured to extract kinetic energy from the pulsating flow of exhaust gas exiting engine 18 while also stabilizing the flow. After passing through first stage turbine 34, the flow of exhaust gas may be directed to turbocharger turbine 30, which may be a second stage of energy extraction from the flow of exhaust gas following first stage turbine 34. Turbocharger turbine 30 may then drive turbocharger compressor 28. First stage turbine 34 and output shaft 16 may be drivingly engaged with engine 18 via an optional suitable speed altering (e.g., planetary) gear train 35.

Figure 3:
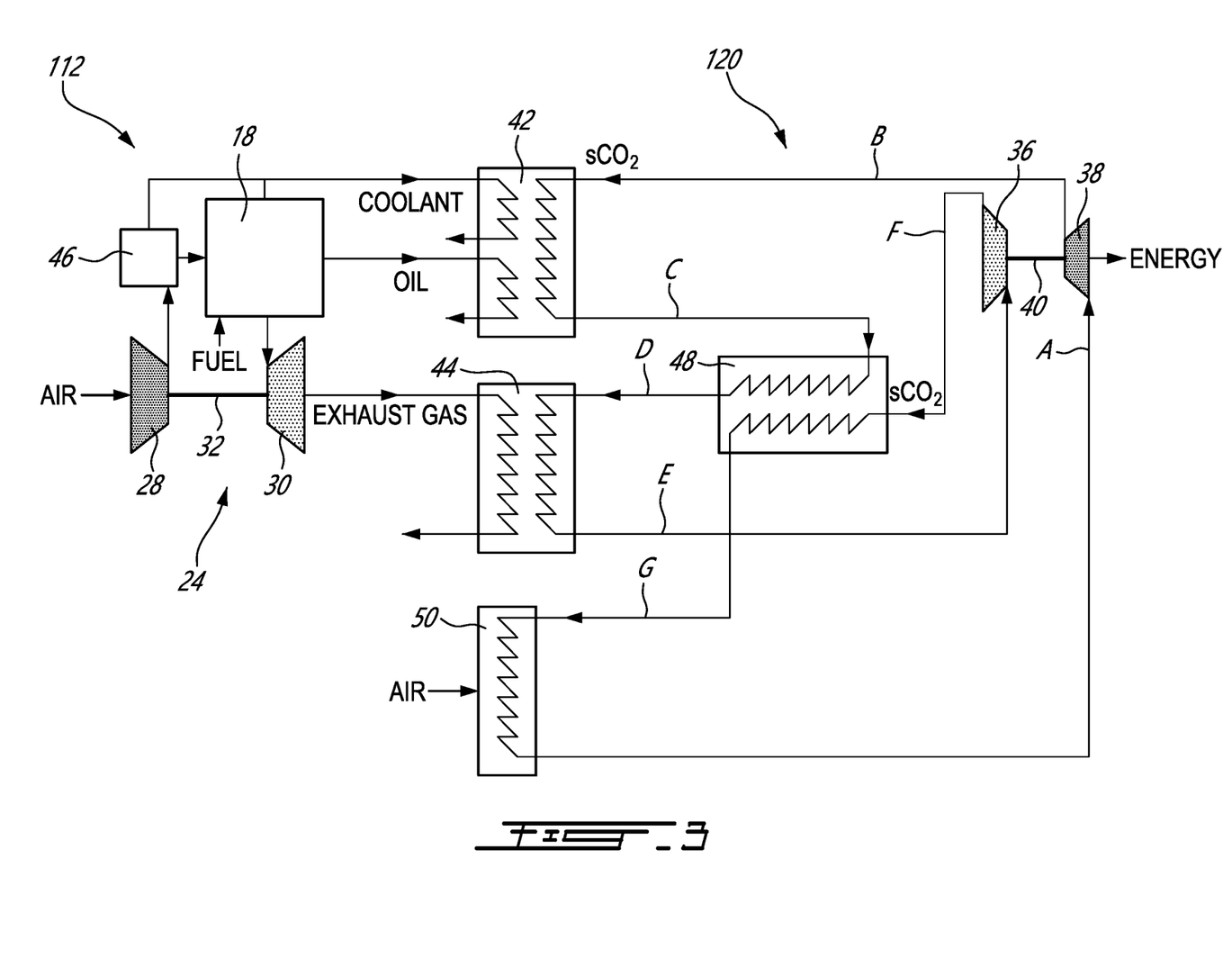
FIG. 3 schematically shows another exemplary aircraft power plant.

FIG. 3 is a schematic representation of another exemplary aircraft power plant 112. Power plant 112 may include combustion engine 18 and optional turbocharger 24 described above. Power plant 112 may include heat engine 120 thermally coupled with one or more sources of heat being rejected by engine 18. Heat engine 120 may include heat engine turbine 36 and heat engine compressor 38 drivingly engaged with heat engine turbine 36 via shaft 40. The working fluid (e.g., $sCO_2$) of heat engine 120 may be compressed by heat engine compressor 38, heated via one or more heat sources of engine 18 and then directed to heat engine turbine 36 where the working fluid is expanded and heat engine turbine 36 is driven to generate mechanical energy that may be used to drive load 22 (shown in FIG. 1). The working fluid exiting heat engine turbine 36 may be cooled before being returned to heat engine compressor 38 for compression to start the thermodynamic cycle again.

Heating sources for the working fluid may include one or more heaters such as low-temperature heater 42 and/or high-temperature heater 44. In relation to the flow of working fluid being heated, low-temperature heater 42 and high-temperature heater 44 may be disposed in series and low-temperature heater 42 may be disposed upstream of high-temperature heater 44. Low-temperature heater 42 may include one or more heat exchangers. In embodiments where engine 18 is liquid-cooled, low temperature heater 42 may, for example, include a first heat exchanger to facilitate heat transfer from a coolant fluid carrying heat from engine 18 to the working fluid of heat engine 120. In embodiments where engine 18 includes a lubricating system circulating lubricating fluid to one or more lubrication loads, low temperature heater 42 may additionally or instead include a second heat exchanger to facilitate heat transfer from the lubricating fluid (e.g., oil) carrying heat from engine 18 to the working fluid of heat engine 120.

In some embodiments, power plant 112 may include an optional intercooler 46 for cooling the combustion air supplied to engine 18 by turbocharger compressor 28. Intercooler 46 may include one or more heat exchangers configured to facilitate heat transfer from combustion air supplied to engine 18 to the coolant fluid. Accordingly, some heat extracted from the combustion air downstream of turbocharger compressor 28 may be transferred to the working fluid of heat engine 120 by way of the coolant fluid.

Following intercooler 46, the combustion air may enter engine 18 where the combustion air may be further compressed, burned with fuel and expanded to generate mechanical energy.

High-temperature heater 44 may include one or more heat exchangers. For example, high-temperature heater 44 may be configured to facilitate heat transfer from the exhaust gas of engine 18 to the working fluid of heat engine 120. In some embodiments, high-temperature heater 44 may be operatively disposed to receive exhaust gas downstream of turbocharger turbine 30. This location of high-temperature heater 44 may permit both first stage turbine 34 and turbocharger turbine 30 to extract energy from the exhaust gas before passing the exhaust gas through high-temperature heater 44.

Power plant 112 may also include recuperator 48 to facilitate heat transfer between a flow of working fluid being heated upstream of heat engine turbine 36 and a flow of working fluid being cooled downstream of heat engine turbine 36. Recuperator 48 may include one or more heat exchangers. Recuperator 48 may be operatively disposed between low-temperature heater 42 and high-temperature heater 44 in relation to the flow of working fluid being heated.

The order of heaters 42, 44 and recuperator 48 along the flow path of the working fluid being heated may be selected based on the temperature of the respective heat sources and may be installed in order of increasing temperature of the respective heat sources so that the working fluid may be progressively heated to a higher temperature as the working fluid moves along the flow path between heat engine compressor 38 and heat engine turbine 36.

Power plant 112 may also include one or more coolers 50 (referred hereinafter in the singular) to facilitate heat transfer between the working fluid being cooled upstream of heat engine compressor 38 and ambient air from outside of aircraft 10. For example, a flow of ambient air may be ducted from the exterior of aircraft 10 to the location of cooler 50 (e.g., radiator) that may be housed inside of aircraft 10. The ambient air may serve as a cold sink for heat engine 20.

Low-temperature heater 42, high-temperature heater 44, recuperator 48, intercooler 46 and cooler 50 may include heat exchangers of suitable types to facilitate heat transfer between fluids. In some embodiments, suitable heat exchangers may include shell and tube heat exchangers and/or plate heat exchangers. In some embodiments, low-temperature heater 42, high-temperature heater 44 and recuperator may include parallel-flow and/or counter-flow heat exchangers.

Figure 4:
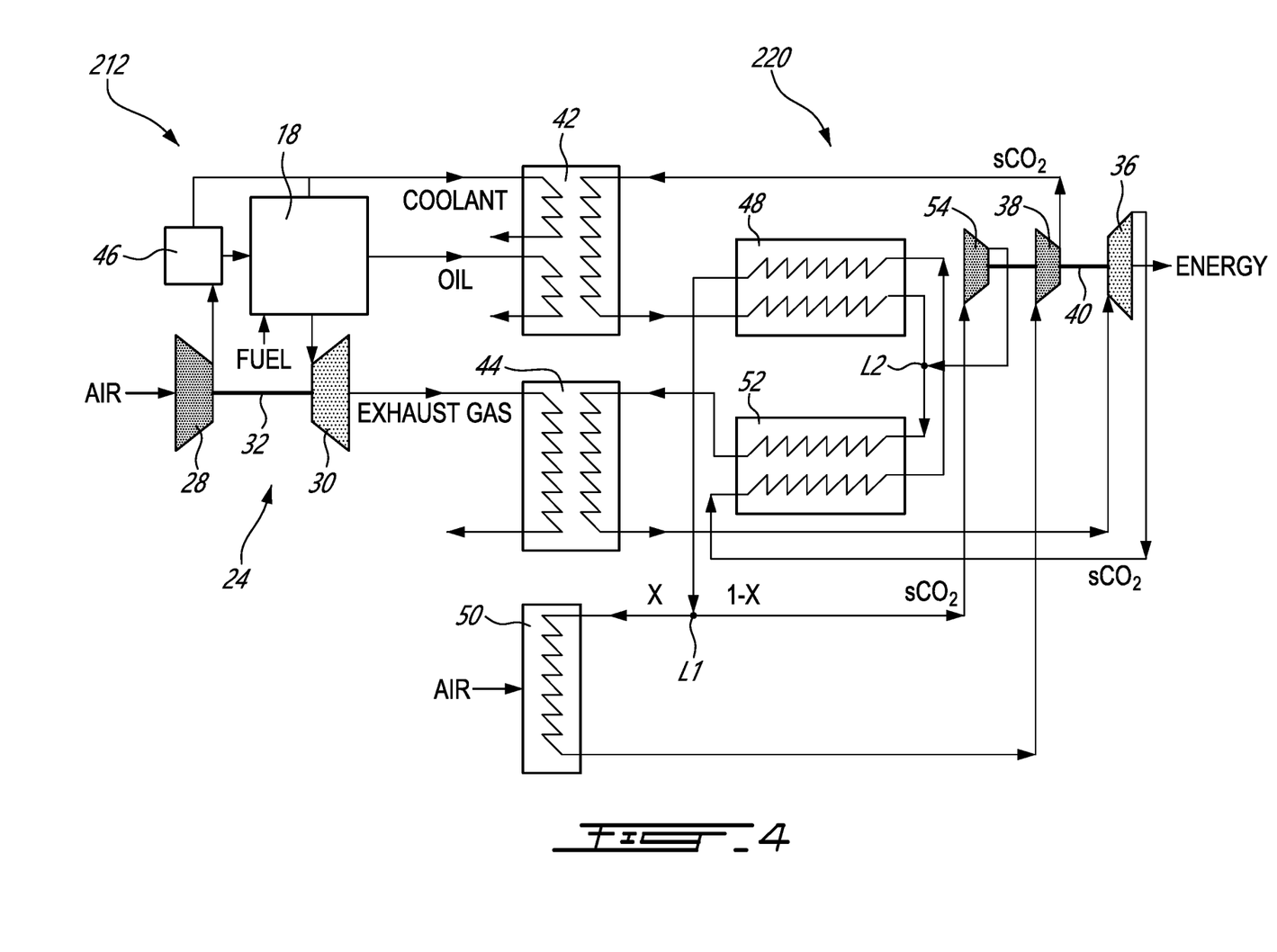
FIG. 4 schematically shows another exemplary aircraft power plant.

FIG. 4 is a schematic representation of another exemplary aircraft power plant 212. Power plant 212 may include elements in common with power plants 12, 112 described above and like elements are identified using like reference numerals. Heat engines 20, 120, 220 described herein may include a combination of features such as single or split flow of working fluid, recuperation, intercooling, pre-heating, re-heating, inter-recuperation, pre-compression, split-expansion, recompression and/or modified recompression for example. Such features may be selected to achieve a desired performance based on the applicable operating conditions. Accordingly, the configurations of heat engines 120, 220 are provided as non-limiting examples and it is understood that such configurations could be varied depending on the applicable operating conditions.

Heat engine 220 may include a split flow of working fluid and a recompression cycle. For example, heat engine 220 may include two recuperators 48 and 52 to facilitate heat transfer between the flow of working fluid being heated and the flow of working fluid being cooled. Recuperator 48 may be a low-temperature recuperator and recuperator 52 may be a high-temperature recuperator. High-temperature recuperator 52 may be operatively disposed between low-temperature recuperator 48 and high-temperature heater 44 in relation to the flow of working fluid being heated.

Heat engine 220 may include recompression compressor 54 drivingly engaged with heat engine turbine 36 so that heat engine turbine 36 may drive both heat engine compressor 38 and recompression compressor 54. Recompression compressor 54 may be operatively coupled to receive a recompression flow of working fluid extracted from the flow of working fluid being cooled at an extraction location L1 downstream of recuperators 48, 52 and upstream of cooler 50. Extraction location L1 may be a flow-splitting location where a first portion X of the working fluid being cooled is directed to cooler 50 and a second portion (1−X) of the fluid being cooled is directed to recompression compressor 54. Recompression compressor 54 may compress the recompression flow of working fluid. Recompression compressor 54 may then deliver the compressed recompression flow of working fluid to the flow of working fluid being heated at a delivery location L2 between recuperators 48, 52. Delivery location L2 may be a flow-merging location where the recompression flow of working fluid is combined with the flow of working fluid being heated.

Figure 5:
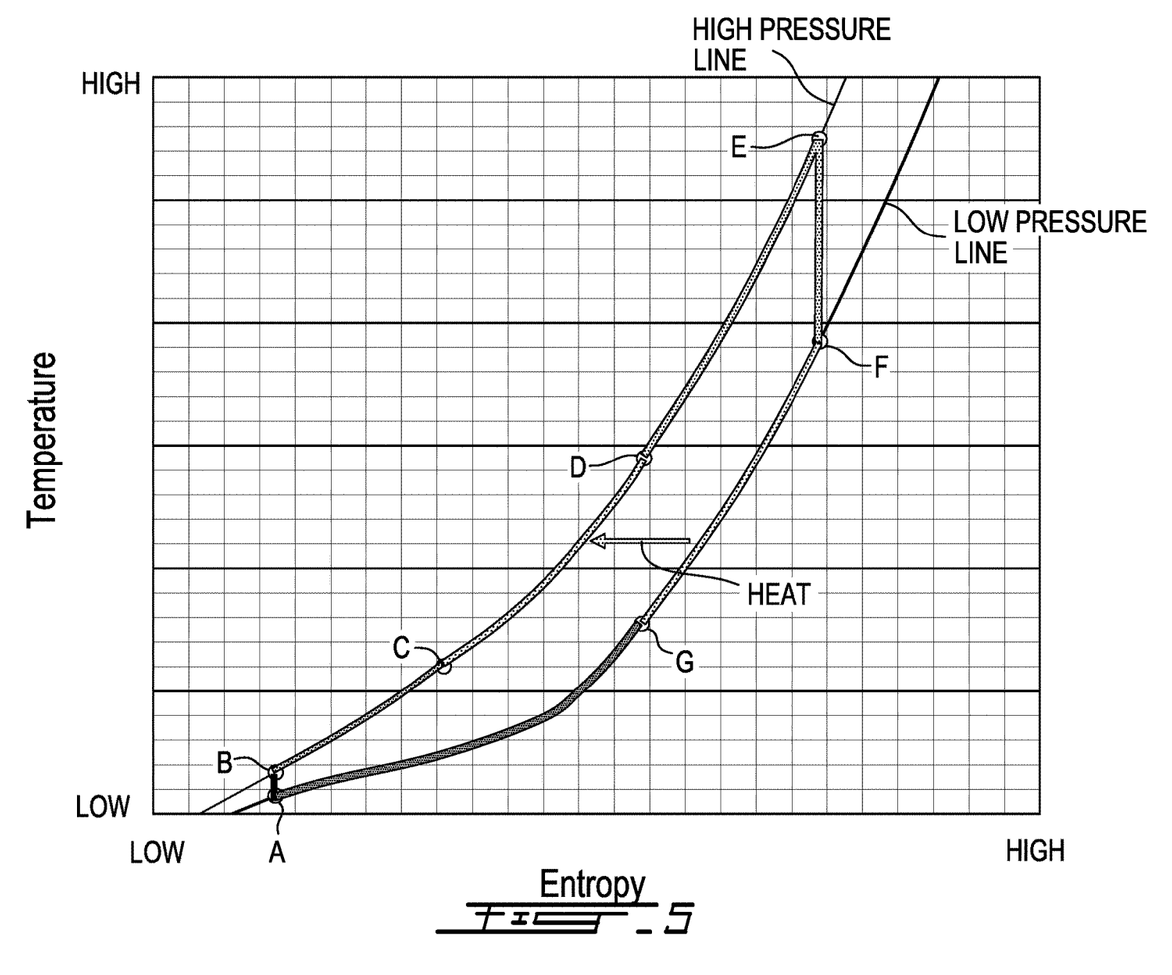
FIG. 5 is a temperature versus entropy graph illustrating an exemplary thermodynamic cycle implemented by a heat engine of the aircraft power plant.

FIG. 5 is a temperature versus entropy graph illustrating an exemplary closed thermodynamic cycle implemented by heat engine 120. The thermodynamic cycle shown in FIG. 5 is explained below in reference to FIG. 3. Locations A-G indicated on the graph of FIG. 5 have corresponding locations A-G indicated within the layout of heat engine 120 shown in FIG. 3. Location A may correspond to the lowest temperature and pressure reached by the working fluid throughout the thermodynamic cycle. In some embodiments, location A may still be at or above the critical point of the working fluid.

Segment A-B of the graph may correspond to the working fluid being compressed by heat engine compressor 38. Segment B-C may correspond to the working fluid being heated by low-temperature heater 42. Segment C-D may correspond to the working fluid being heated by recuperator 48. Segment D-E may correspond to the working fluid being heated by high-temperature heater 44. Segment E-F may correspond to the working fluid being expanded through heat engine turbine 36. Segment F-G may correspond to the working fluid being cooled by recuperator 48. Segment G-A may correspond to the working fluid being cooled by cooler 50.

Figure 6:
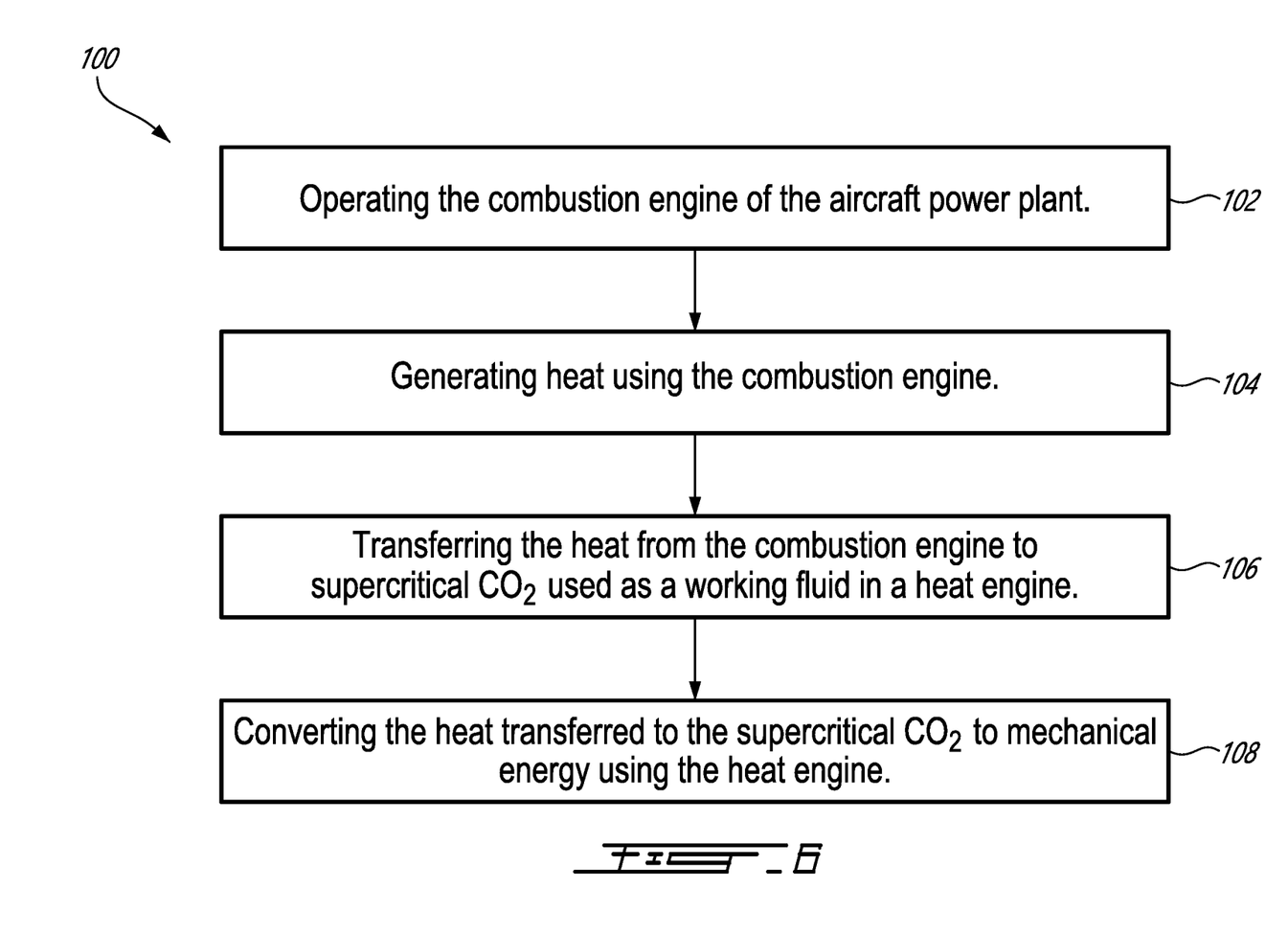
FIG. 6 is a flowchart of an exemplary method of operating an aircraft power plant including a combustion engine.

FIG. 6 is a flowchart of an exemplary method 100 of operating power plant 12, 112, 212 including engine 18 or other aircraft power plant. Aspects of method 100 may be combined with steps of other methods, or other aspects described herein. In various embodiments, method 100 may include:

operating engine 18 of power plant 12, 112, 212 (block 102);

generating heat using engine 18 (block 104);

transferring the heat from engine 18 to supercritical $CO_2$ ($sCO_2$) used as a working fluid in heat engine 20, 120, 220 (block 106); and converting the heat transferred to the $sCO_2$ to mechanical energy using heat engine 20, 120, 220 (block 108).

Method 100 may include transferring heat from a coolant fluid and/or a lubricating fluid of engine 18 to the $sCO_2$.

Method 100 may, instead or in addition, include transferring heat from an exhaust gas of engine 18 to the $sCO_2$.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. An aircraft propulsion system comprising:
   an internal combustion engine using intermittent combustion during operation;
   a propeller for propelling the aircraft, the propeller being drivingly engaged with the internal combustion engine;
   a turbocharger associated with the internal combustion engine, the turbocharger including:
      a turbocharger turbine configured to be driven by a flow of exhaust gas from the internal combustion engine; and
      a turbocharger compressor drivingly engaged with the turbocharger turbine and configured to compress combustion air for the internal combustion engine;
   a heat engine using supercritical carbon dioxide ($sCO_2$) as a working fluid to convert heat into mechanical energy; and
   a first heat exchanger to facilitate heat transfer between the exhaust gas downstream of the turbocharger turbine and the $sCO_2$.

2. The aircraft propulsion system as defined in claim 1, comprising a second heat exchanger to facilitate heat transfer between a coolant fluid of the internal combustion engine and the $sCO_2$, the second heat exchanger being operatively disposed upstream of the first heat exchanger relative to a first flow of the $sCO_2$ in the first and second heat exchangers.

3. The aircraft propulsion system as defined in claim 2, comprising a third heat exchanger to facilitate heat transfer between a lubricating fluid of the internal combustion engine and the $sCO_2$, the third heat exchanger being operatively disposed upstream of the first heat exchanger relative to the first flow of the $sCO_2$.

4. The aircraft propulsion system as defined in claim 2, wherein:
   the heat engine includes a heat engine turbine and a heat engine compressor drivingly engaged with the heat engine turbine;
   the aircraft propulsion system includes a first recuperator to facilitate heat transfer between the first flow of $sCO_2$ and a second flow of $sCO_2$ flowing from the heat engine turbine toward the heat engine compressor; and
   the recuperator is operatively disposed between the first and second heat exchangers relative to the first flow of the $sCO_2$.

5. The aircraft propulsion system as defined in claim 4, wherein:
   the aircraft propulsion system includes a second recuperator to facilitate heat transfer between the first flow of $sCO_2$ and the second flow of $sCO_2$; and
   the second recuperator is operatively disposed between the first recuperator and the second heat exchanger in relation to the first flow of $sCO_2$.

6. The aircraft propulsion system as defined in claim 5, comprising a recompression compressor operatively coupled to:

receive a recompression flow of sCO$_2$ extracted from the second flow of sCO$_2$ at an extraction location downstream of the first and second recuperators;

compress the recompression flow of sCO$_2$; and deliver the compressed recompression flow of sCO$_2$ to the first flow of sCO$_2$ at a delivery location between the first and second recuperators.

7. The aircraft propulsion system as defined in claim 1, wherein the internal combustion engine is a Wankel engine.

8. An aircraft power plant comprising:

a Wankel engine;

a heat engine using supercritical carbon dioxide (sCO$_2$) as a working fluid to convert heat into mechanical energy, the heat engine being in thermal communication with exhaust gas from the Wankel engine; and a turbocharger associated with the Wankel engine, the turbocharger including:
 a turbocharger turbine configured to be driven by the exhaust gas from the Wankel engine; and
 a turbocharger compressor drivingly engaged with the turbocharger turbine and configured to compress combustion air for the Wankel engine,
wherein the heat engine is in thermal communication with the exhaust gas downstream of the turbocharger turbine.

9. The aircraft power plant as defined in claim 8, comprising a heater to facilitate heat transfer between a coolant fluid of the Wankel engine and the sCO$_2$.

10. The aircraft power plant as defined in claim 9, wherein:

the heater is a first heater;

the aircraft power plant includes a second heater to facilitate heat transfer between the exhaust gas of the Wankel engine and the sCO$_2$; and the second heater is operatively disposed downstream of the first heater relative to a first flow of the sCO$_2$ in the first and second heaters.

11. The aircraft power plant as defined in claim 10, wherein the first heater is also configured to facilitate heat transfer between a lubricating fluid of the Wankel engine and the sCO$_2$.

12. The aircraft power plant as defined in claim 10, comprising an intercooler configured to facilitate heat transfer from combustion air for the Wankel engine to the coolant fluid.

13. The aircraft power plant as defined in claim 10, wherein:

the heat engine includes a heat engine turbine and a heat engine compressor drivingly engaged with the heat engine turbine;

the aircraft power plant includes a recuperator to facilitate heat transfer between the first flow of sCO$_2$ and a second flow of sCO$_2$ flowing from the heat engine turbine toward the heat engine compressor;

the recuperator is operatively disposed between the first and second heaters relative to the first flow of the sCO$_2$; and the aircraft power plant includes a cooler to facilitate heat transfer between the second flow of sCO$_2$ and ambient air outside of an aircraft.

14. The aircraft power plant as defined in claim 13, wherein:

the recuperator is a first recuperator;

the aircraft power plant includes a second recuperator to facilitate heat transfer between the first flow of sCO$_2$ and the second flow of sCO$_2$;

the second recuperator is operatively disposed between the first recuperator and the second heater in relation to the first flow of sCO$_2$;

the aircraft power plant includes a recompression compressor operatively coupled to:
 receive a recompression flow of sCO$_2$ extracted from the second flow of sCO$_2$ at an extraction location downstream of the first and second recuperators and upstream of the cooler;
 compress the recompression flow of sCO$_2$; and
 deliver the compressed recompression flow of sCO$_2$ to the first flow of sCO$_2$ at a delivery location between the first and second recuperators.

15. The aircraft power plant as defined in claim 8, comprising:

a first heater to facilitate heat transfer between a lubricating fluid of the Wankel engine and the sCO$_2$; and a second heater to facilitate heat transfer between the exhaust gas and the sCO$_2$, the second heater being operatively disposed downstream of the first heater relative to a flow of the sCO$_2$ in the first and second heaters.

16. The aircraft power plant as defined in claim 8, wherein the aircraft power plant is an auxiliary power unit coupled to supply energy exclusively for functions other than propulsion of the aircraft.

17. A method of operating an aircraft power plant including an internal combustion engine, the method comprising:

operating the internal combustion engine of the aircraft power plant using intermittent combustion;

generating heat using the internal combustion engine;

transferring the heat from the internal combustion engine to supercritical carbon dioxide (sCO$_2$) used as a working fluid in a heat engine; and converting at least some of the heat transferred to the sCO$_2$ to mechanical energy using the heat engine;

wherein the internal combustion engine is a Wankel engine and the method includes operating the internal combustion engine to propel the aircraft;

wherein a turbocharger is associated with the Wankel engine, the turbocharger includes:
 a turbocharger turbine configured to be driven by exhaust gas from the Wankel engine; and
 a turbocharger compressor drivingly engaged with the turbocharger turbine and configured to compress combustion air for the Wankel engine; and
wherein the heat engine is in thermal communication with the exhaust gas downstream of the turbocharger turbine.

18. The method as defined in claim 17, comprising:

transferring heat from a coolant fluid of the internal combustion engine to the sCO$_2$;

transferring heat from a lubricating fluid of the internal combustion engine to the sCO$_2$; and transferring heat from an exhaust gas of the internal combustion engine to the sCO$_2$.

* * * * *